US012763714B2

(12) United States Patent
Murthy

(10) Patent No.: US 12,763,714 B2
(45) Date of Patent: Oct. 13, 2026

(54) SYSTEMS FOR ACTIVE DISCHARGE FOR INVERTER FOR ELECTRIC VEHICLE

(71) Applicant: BorgWarner US Technologies LLC, Wilmington, DE (US)

(72) Inventor: Vikram Murthy, Carmel, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 223 days.

(21) Appl. No.: 18/767,409

(22) Filed: Jul. 9, 2024

(65) Prior Publication Data

US 2026/0019021 A1 Jan. 15, 2026

(51) Int. Cl.
*H02P 1/00* (2006.01)
*H02P 27/08* (2006.01)

(52) U.S. Cl.
CPC .................................... *H02P 27/08* (2013.01)

(58) Field of Classification Search
CPC ........ H02P 27/08; H02P 27/06; H02P 27/085; H02P 7/29; H02P 25/18
See application file for complete search history.

(56) References Cited

U.S. PATENT DOCUMENTS 10,384,561 B2 8/2019 Yang et al.
2018/0076752 A1* 3/2018 Kochan, Jr. ............. H02M 3/07
2022/0263404 A1* 8/2022 Volke .................. H02M 7/5387
2024/0120151 A1* 4/2024 Yadav .................... H01G 4/228

FOREIGN PATENT DOCUMENTS

JP 2007331454 A * 12/2007

OTHER PUBLICATIONS

NXP GD3162 Datasheet.
STMicro L9502 Datasheet.

* cited by examiner

*Primary Examiner* — Karen Masih
(74) *Attorney, Agent, or Firm* — Joshua M. Haines; Bookoff McAndrews, PLLC

(57) ABSTRACT

A system includes: an inverter configured to convert DC power from a battery to AC power to drive a motor, wherein the inverter includes: a bulk capacitor; one or more switches; a gate driver; and one or more controllers, wherein the one or more controllers are configured to provide one or more of a gate voltage or a pulse width modulated (PWM) signal to the gate driver to control the one or more switches to discharge the bulk capacitor.

20 Claims, 6 Drawing Sheets

SYSTEMS FOR ACTIVE DISCHARGE FOR INVERTER FOR ELECTRIC VEHICLE

TECHNICAL FIELD

Various embodiments of the present disclosure relate generally to systems for controlling an active discharge of an inverter for an electric vehicle, and, more particularly, to systems to dynamically control linear active discharge of an inverter for an electric vehicle.

BACKGROUND

Inverters, such as those used to drive a motor in an electric vehicle, for example, are responsible for converting High Voltage Direct Current (HVDC) into Alternating Current (AC) to drive the motor. In an inverter, a bulk capacitor is discharged in the event of a fault condition to reduce the risk of contact with high voltages. Active discharge of the bulk capacitor may stress power switches.

The present disclosure is directed to overcoming one or more of these above-referenced challenges.

SUMMARY OF THE DISCLOSURE

In some aspects, the techniques described herein relate to a system including: an inverter configured to convert DC power from a battery to AC power to drive a motor, wherein the inverter includes: a bulk capacitor; one or more switches; a gate driver; and one or more controllers, wherein the one or more controllers are configured to provide one or more of a gate voltage or a pulse width modulated (PWM) signal to the gate driver to control the one or more switches to discharge the bulk capacitor.

In some aspects, the techniques described herein relate to a system, wherein the inverter further includes: a gate driver power supply configured to provide an output voltage to the gate driver, wherein the one or more controllers are further configured to provide the one or more of the gate voltage and the PWM signal to the gate driver by controlling the output voltage of the gate driver power supply.

In some aspects, the techniques described herein relate to a system, wherein the gate driver power supply includes an adjustable voltage source configured to control the output voltage of the gate driver power supply to the gate driver.

In some aspects, the techniques described herein relate to a system, wherein the one or more controllers are configured to control the output voltage of the gate driver power supply to the gate driver by controlling a voltage output of the adjustable voltage source.

In some aspects, the techniques described herein relate to a system, wherein the gate driver power supply includes a low-dropout linear regulator that includes an input terminal and an output terminal, wherein the voltage output of the adjustable voltage source is input to the input terminal, and wherein the output voltage of the gate driver power supply is output through the output terminal.

In some aspects, the techniques described herein relate to a system, wherein the gate driver includes an under-voltage lockout (UVLO) fault and a dead-time protection (DTP), and wherein the one or more controllers are configured to disable the UVLO fault and the DTP.

In some aspects, the techniques described herein relate to a system, wherein the one or more controllers are configured to disable the UVLO fault and the DTP using a serial peripheral interface (SPI) of the gate driver.

In some aspects, the techniques described herein relate to a system, wherein the inverter includes a high voltage area and a low voltage area, wherein the gate driver power supply is provided in the high voltage area of the inverter.

In some aspects, the techniques described herein relate to a system, further including: the battery configured to supply the DC power to the inverter; and the motor configured to receive the AC power from the inverter to drive the motor, wherein the system is provided as a vehicle including the inverter, the battery, and the motor.

In some aspects, the techniques described herein relate to a system including one or more controllers configured to: control a gate driver to output one or more of a gate voltage or a pulse width modulated (PWM) signal to one or more switches to discharge a bulk capacitor based on controlling an output voltage of a gate driver power supply to the gate driver.

In some aspects, the techniques described herein relate to a system, wherein the gate driver power supply includes a low-dropout linear regulator including an adjustable voltage source, and wherein the one or more controllers are further configured to control the output voltage of the gate driver power supply to the gate driver by controlling an output voltage of the adjustable voltage source.

In some aspects, the techniques described herein relate to a system, wherein the gate driver is configured to have an under-voltage lockout (UVLO) fault and a dead-time protection (DTP).

In some aspects, the techniques described herein relate to a system, wherein the one or more controllers are configured to disable the UVLO fault and the DTP of the gate driver by using a serial peripheral interface (SPI) of the gate driver.

In some aspects, the techniques described herein relate to a system, wherein the gate driver is an automotive safety integrity level (ASIL-D) gate driver.

In some aspects, the techniques described herein relate to a system, wherein the one or more controllers are configured to enable the UVLO fault and the DTP of the gate driver after the bulk capacitor is discharged.

In some aspects, the techniques described herein relate to a system, wherein the one or more of the gate voltage and the PWM signal includes a gate voltage and a PWM signal, wherein the gate voltage output by the gate driver when the UVLO fault is disabled is lower than the gate voltage output by the gate driver when the UVLO fault is enabled, and wherein a pulse width of the PWM signal output by the gate driver when the DTP is disabled is shorter in time than a pulse width of the PWM signal output by the gate driver when the DTP is enabled.

In some aspects, the techniques described herein relate to a system including: a gate driver; a gate driver power supply configured to supply an output voltage to the gate driver; and one or more controllers configured to control the output voltage of the gate driver power supply to the gate driver to output one or more of a gate voltage or a pulse width modulated (PWM) signal to one or more switches to discharge a bulk capacitor.

In some aspects, the techniques described herein relate to a system, further including: an adjustable voltage source configured to be controlled by the one or more controllers, wherein the one or more controllers are configured to control the output voltage of the gate driver power supply by controlling an output voltage of the adjustable voltage source.

In some aspects, the techniques described herein relate to a system, wherein, the gate driver is configured to have an under-voltage lockout (UVLO) fault and a dead-time protection (DTP), the one or more controllers are configured to disable the UVLO fault and the DTP of the gate driver to discharge the bulk capacitor, and the one or more controllers are configured to enable the UVLO fault and the DTP of the gate driver after the bulk capacitor is discharged.

In some aspects, the techniques described herein relate to a system, wherein the one or more controllers are further configured to control the output voltage of the gate driver power supply to the gate driver to output the gate voltage and the PWM signal to the one or more switches to discharge the bulk capacitor.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
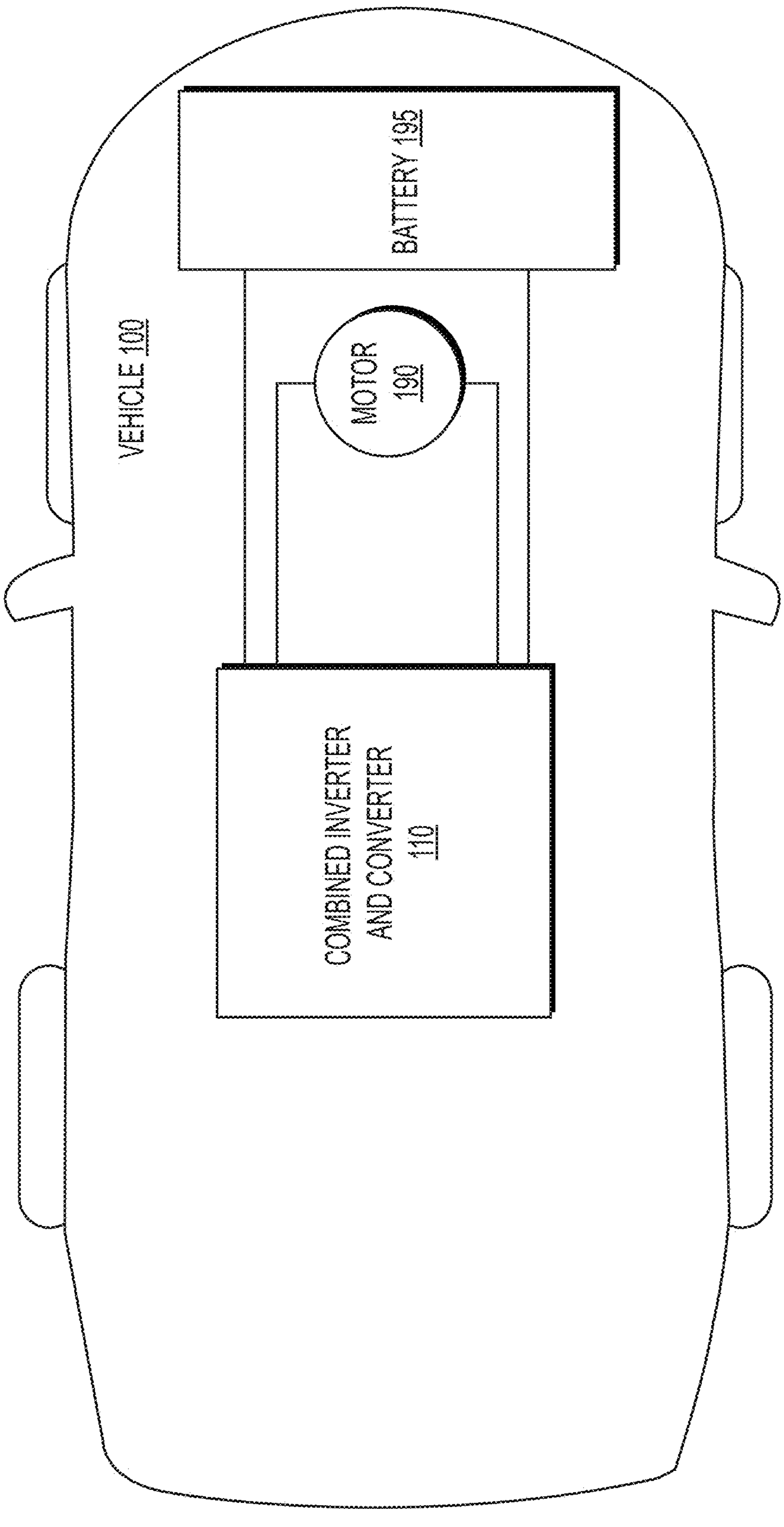
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms “comprises,” “comprising,” “has,” “having,” “includes,” “including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, “about,” “substantially,” and “approximately” are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems for controlling an active discharge of an inverter for an electric vehicle, and, more particularly, to systems to dynamically control linear active discharge of an inverter for an electric vehicle.

Inverters, such as those used to drive a motor in an electric vehicle, for example, are responsible for converting High Voltage Direct Current (HVDC) into Alternating Current (AC) to drive the motor. A three phase inverter may include a bridge with six power device switches (for example, power transistors such as IGBT or MOSFET) that are controlled by Pulse Width Modulation (PWM) signals generated by a controller. An inverter may include three half-H bridge switches to control the phase voltage, upper and lower gate drivers to control the switches, a PWM controller, and glue logic between the PWM controller and the gate drivers. The PWM controller may generate signals to define the intended states of the system. The gate drivers may send the signals from the PWM controller to the half-H bridge switches. The half-H bridge switches may drive the phase voltage. Six phase (or other phase) inverters and multi-level inverters are not excluded from this concept and will follow similar principles.

As a result of system design, a significant amount of energy may be stored on the high voltage bus bulk/DC link capacitor of the inverter. This stored high voltage energy must be dissipated to prevent human exposure to dangerous voltage levels. A function of inverters called “active discharge” allows for the controlled dissipation of the stored energy in the system capacitance. The system capacitance is generally referred to as a bulk capacitor in inverter systems. A high voltage battery providing energy to the inverter is disconnected prior to initiating active discharge of the bus to avoid discharging the battery. The active discharge function has the ability to quickly dissipate high voltage bus energy for safety in events such as vehicle service, vehicle crash, and the like. The rate of discharge is a function of initial bus voltage, capacitance, and the energy dissipation mechanism. Government/OEM regulations also dictate what discharge rates are required. For example, regulations may require that a high voltage bus must be discharged below 60V in less than 2.5 seconds.

Inverters frequently have a safety requirement to discharge the bulk capacitor on the inverter, in the event of a crash or other fault situation, in a short period of time, such as between 1 and 3 seconds, for example. Some systems discharge the bulk capacitor using the motor windings, which requires the motor to not be shorted and for the main microcontroller to be available. Some systems discharge the bulk capacitor using a dedicated resistive discharge, which is frequently a combination of high power resistors, a switch, and a controller.

Accordingly, an inverter may use switching losses in the inverter power device switches (e.g., IGBT/FET) to discharge energy. Controlling the power devices ON/OFF (also referred to as enabling/disabling) creates losses that can be predicted. Switching numerous times at a high frequency rate will contribute to a significant amount of these accumulated losses. A rate of the discharge (losses) may be proportional to the switching frequency. These losses can be used to discharge the HVDC bus quickly, as a backup or without the added cost and complexity of using the motor windings or a dedicated resistive discharge. Additionally, by eliminating the resistive element from some approaches, substantial cost, circuit board area, and unwanted heat can be saved.

Inverters, such as those used to drive a motor in an electric vehicle, for example, are responsible for converting High Voltage Direct Current (HVDC) into Alternating Current (AC) to drive the motor. In an inverter, a bulk capacitor is discharged in the event of a fault condition to reduce the risk of contact with high voltages. Active discharge of the bulk capacitor may stress power switches. Stressing power switches may occur during active discharge where the SiC semiconductor is biased with a lower gate voltage and the device is operating in an ohmic region, thus operating as a resistor.

Some systems discharge the bulk capacitor using gate drivers to operate one power switch in the half-H bridge switches in a linear mode, which effectively uses the power switch as a resistor by controlling the gate positive bias voltage and/or switching. In this methodology, one power switch (e.g. upper switch) is turned ON as in a normal operation, and the other power switch (e.g. lower switch) is pulsed ON with a reduced gate voltage. The HVDC bus and bulk capacitor may be discharged via specific PWM pulses. The drain current of a power switch may increase by a factor of eight or more with a temperature variation. This temperature variation may be due to self-heating of the power switch when in a linear mode, or an initial temperature of the power switch at the initialization of active discharge, for example. During active discharge, the power switch may experience an increase in temperature that is significant enough to produce failure if the temperature is not controlled.

A power switch may have a significant difference in a transfer characteristic based on temperature, especially in a linear mode region targeted by the DC-Link discharge. Temperature differences may be based on environmental temperatures, and may include temperatures such as −40 C to 100° C. operating temperatures, for example.

Some systems discharge the bulk capacitor using threshold detection, which requires an opposite device to be off, may have an option to increase a sensed threshold by one step (e.g. 390 mV), and may have a voltage that is fixed at a start of the discharge operation and not variable during the discharge operation. Some systems discharge the bulk capacitor using a pre-programmed voltage, where the voltage is fixed at power-up during a configuration mode, and cannot be changed during an operation of the inverter.

Some systems used to perform discharge of a DC Link capacitor use large, high power resistors which are activated via a FET to resistively discharge the DC Link capacitor. Some systems perform discharge by using gate driver integrated circuits (ICs) in combination with inverter power switches, which are normally used to drive electric machines. Some gate drivers implement hard switching of power devices connected across the capacitive load. The upper and lower devices are turned on such that current is effectively shorted from HV+ to HV− for a short period of time to discharge the DC Link capacitor (e.g., shoot through current mode of active discharge). Some gate drivers turn the power semiconductor on in a resistive linear mode by setting the Vgs voltage to a defined value, to discharge at a sufficiently low value of current so as to not destroy or overheat the power switch which is operated in a linear mode (e.g., controlled shoot through current mode of active discharge). In addition, the current may change as the power semiconductor heats up, with positive feedback not considered to discharge at the intended low current.

The discharge may need to accommodate higher system voltages than anticipated by gate drivers ICs, and the energy stored in the capacitor increases with the square of voltage (e.g., E=½*C*V^2). Protection mechanisms (e.g. temperature sense) assumed to be usable by the gate drivers may not be usable for fast, high power discharge pulses. Timely discharge of the DC Link capacitor may require periodic adjustment of the discharge profile, such that discharge can be achieved in the allowable time frame dictated by safety standards, as interpreted by vehicle manufacturers. Some methodologies limited to using the features provided by gate drivers may result in control of discharge of bulk capacitors being limited. Accordingly, one or more embodiments disclosed herein may overcome the issues of some methodologies of active discharge as described above.

One or more embodiments may provide a way to dynamically control linear active discharge independent of gate driver features. One or more embodiments may control an output of a gate driver power supply to output a programmable and controllable voltage in order to operate SiC MOSFETs in a linear mode.

Automotive safety integrity level (ASIL-D) gate drivers (also known as "smart gate drivers") (herein referred to as "gate drivers") may be configured to use serial peripheral interfaces (SPI) to program gate drive parameters and faults. Some gate drivers may include two faults that protect inverters, such as the under-voltage lockout (UVLO) fault and the dead-time protection (DTP) fault, which may prevent a shoot through event in the inverter. Manufacturers of gate drivers may provide ways to mask (or disable) UVLO and DTP using SPI, so that when the UVLO and DTP faults are detected, the inverter's fault reaction may be disabled and the inverter may continue operation. Such a reaction from inverters may also be programmable using SPI. The disabling of the UVLO fault may allow control of a gate voltage by providing finer resolution of output voltage than resolution of output voltage in systems with gate drivers where the faults are not disabled. For example, gate drivers in some systems have 200 mV resolution, which may be highly limiting. For example, gate drivers in some systems may output only full voltage to perform a shoot through. Accordingly, one or more embodiments may include the use of a microcontroller output to directly adjust the power supply controlling the gate voltage.

One or more embodiments may include adjusting the gate driver power supply output controlling the gate voltage. In one or more embodiments, gate voltage adjustment may be achieved by adjusting the feedback output of a low-dropout linear regulator included in the gate driver power supply. In one or more embodiments, the feedback output may be set by a voltage divider. In one or more embodiments, to make the power supply output adjustable, a resistor may be added in parallel to the feedback node tied to an adjustable voltage source. In one or more embodiments, the adjustable voltage control may be accomplished by a PWM with an RC filter, or a digital-to-analog converter (DAC), for example, but embodiments are not limited thereto.

One or more embodiments may accelerate a discharge rate of a bulk capacitor by increasing gate voltage and/or increasing the pulse width by using any smart gate driver with the ability to disable the UVLO and DTP faults.

FIG. 1 depicts an exemplary system infrastructure for a vehicle including a combined inverter and converter, according to one or more embodiments. Alternatively, the inverter may be an inverter without a converter. In the context of this disclosure, the inverter without a converter, or the combined inverter and converter, may be referred to as an inverter 110. As shown in FIG. 1, electric vehicle 100 may include an inverter 110, a motor 190, and a battery 195. The inverter 110 may include components to receive electrical power from an external source and output electrical power to charge the battery 195 of electric vehicle 100. The inverter 110 may convert DC power from the battery 195 in electric vehicle 100 to AC power, to drive (e.g. rotate) the motor 190 of the electric vehicle 100, for example, but the embodiments are not limited thereto. The inverter 110 may be bidirectional, and may convert DC power to AC power, or convert AC power to DC power, such as during regenerative braking, for example. The inverter 110 may be a three-phase inverter, a single-phase inverter, or a multi-phase inverter.

Figure 2:
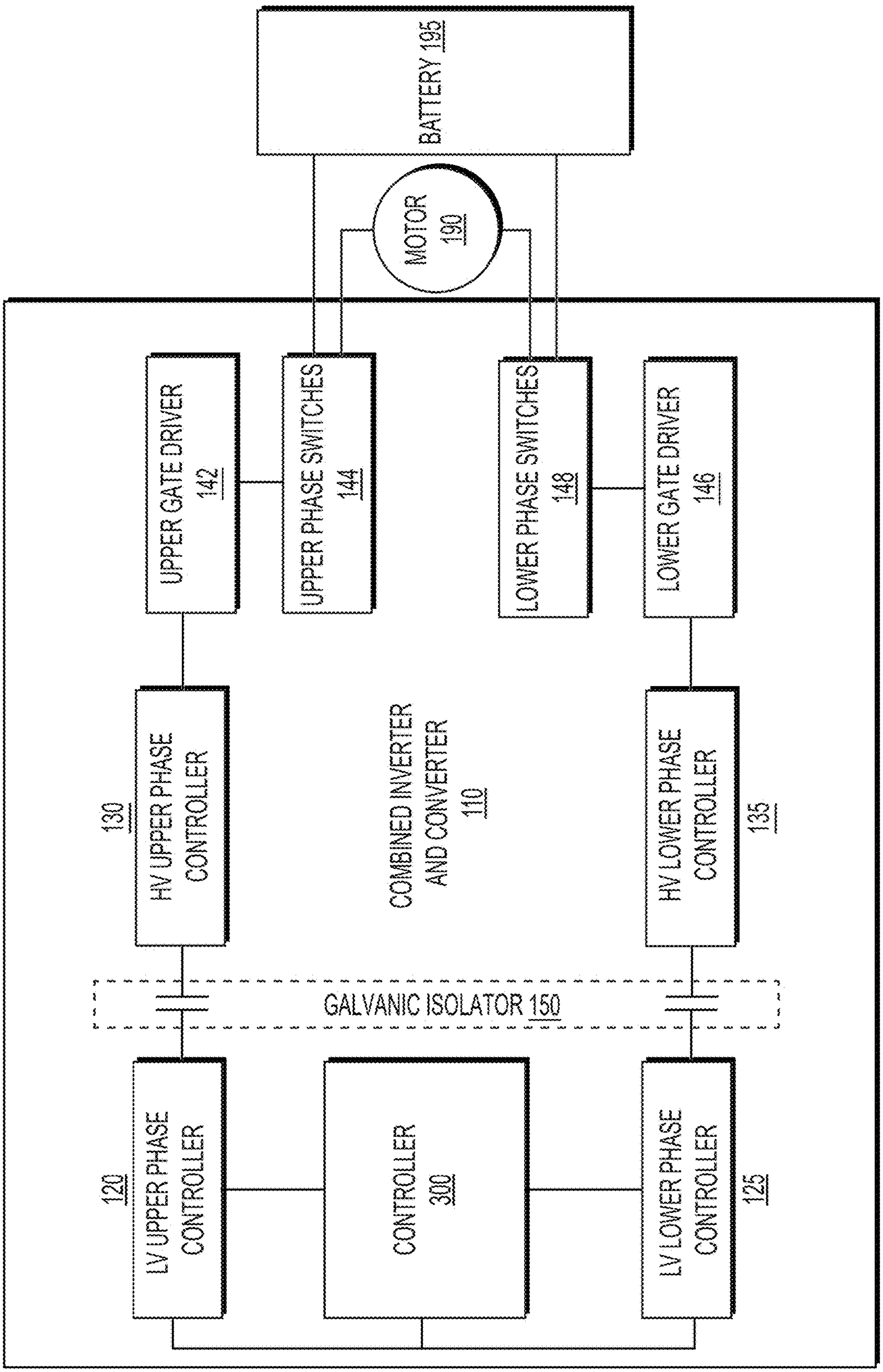
FIG. 2 depicts an exemplary system infrastructure for the combined inverter and converter of FIG. 1, according to one or more embodiments.

FIG. 2 depicts an exemplary system infrastructure for the combined inverter and converter of FIG. 1, according to one or more embodiments. Inverter 110 may include an inverter controller 300 (shown in FIG. 3) to control the inverter 110. Inverter 110 may include a low voltage upper phase controller 120 separated from a high voltage upper phase controller 130 by a galvanic isolator 150. Inverter 110 may include a low voltage lower phase controller 125 separated from a high voltage lower phase controller 135 by galvanic isolator 150. Inverter 110 may include a high voltage upper phase controller 130 including a gate driver power supply, an upper gate driver 142, and upper phase switches 144. Inverter 110 may include a high voltage lower phase controller 135 including a gate drive power supply, a lower gate driver 146, and lower phase switches 148. Upper phase switches 144 and lower phase switches 148 may be connected to motor 190 and battery 195. Galvanic isolator 150 may be one or more of optical, transformer-based, or capacitance-based isolation, but embodiments are not limited thereto. Galvanic isolator 150 may be one or more capacitors with a value from approximately 20 fF to approximately 100 fF, with a breakdown voltage from approximately 6 kV to approximately 12 kV, for example, but embodiments are not limited thereto. Galvanic isolator 150 may include a pair of capacitors, where one capacitor of the pair carries an inverse data signal from the other capacitor of the pair to create a differential signal for common-mode noise rejection. Galvanic isolator 150 may include more than one capacitor in series. Galvanic isolator 150 may include one capacitor located on a first IC, or may include a first capacitor located on a first IC and a second capacitor located on a second IC that communicates with the first IC.

Inverter 110 may include a low voltage area, where voltages are generally less than 5V, for example, and a high voltage area, where voltages may exceed 500V, for example. The low voltage area may be separated from the high voltage area by galvanic isolator 150. Inverter controller 300 may be in the low voltage area of inverter 110, and may send signals to and receive signals from low voltage upper phase controller 120. Low voltage upper phase controller 120 may be in the low voltage area of inverter 110, and may send signals to and receive signals from high voltage upper phase controller 130. Low voltage upper phase controller 120 may send signals to and receive signals from low voltage lower phase controller 125. High voltage upper phase controller 130 may be in the high voltage area of inverter 110. Accordingly, signals between low voltage upper phase controller 120 and high voltage upper phase controller 130 pass through galvanic isolator 150. High voltage upper phase controller 130 may send signals to and receive signals from the upper gate driver 142. The upper gate driver 142 may send signals to and receive signals from the upper phase switches 144. Upper phase switches 144 may be connected to motor 190 and battery 195. Upper phase switches 144 and lower phase switches 148 may be used to transfer energy from motor 190 to battery 195, from battery 195 to motor 190, from an external source to battery 195, or from battery 195 to an external source, for example. The lower phase system of inverter 110 may be similar to the upper phase system as described above.

Figure 3:
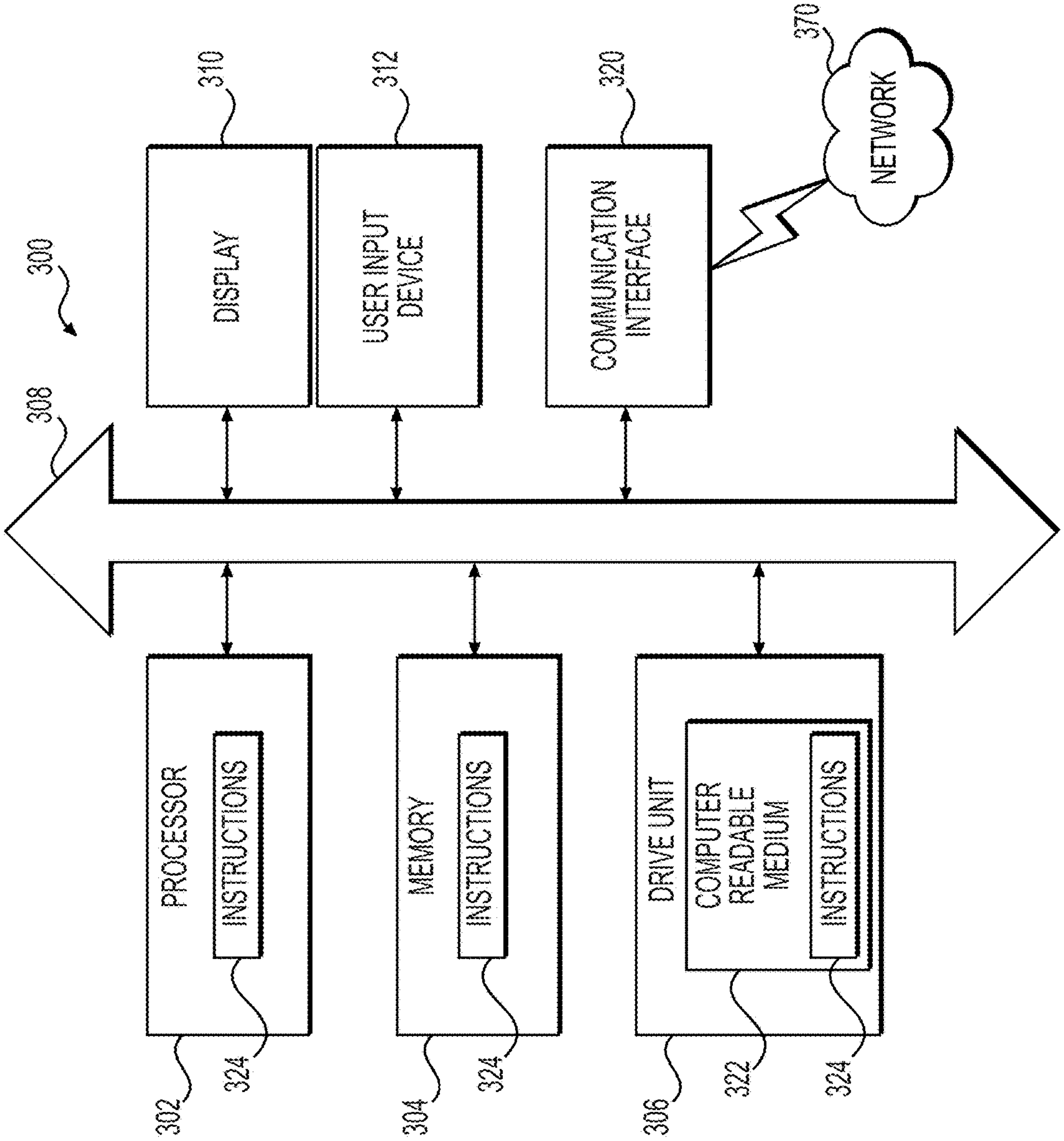
FIG. 3 depicts an exemplary system infrastructure for inverter controller 300 of FIG. 2, according to one or more embodiments.

FIG. 3 depicts an exemplary system infrastructure for the inverter controller 300 of FIG. 2, according to one or more embodiments. The inverter controller 300 may include one or more controllers. The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As shown in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits (ICs), field programmable gate arrays, servers, networks, digital circuits, analog circuits, combinations thereof, or other now known or later developed devices for analyzing and processing data. The processor 302 may implement a software program, such as code generated manually (e.g., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits (ICs), firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of the inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, the computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits (ICs), programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit (IC). Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component or object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
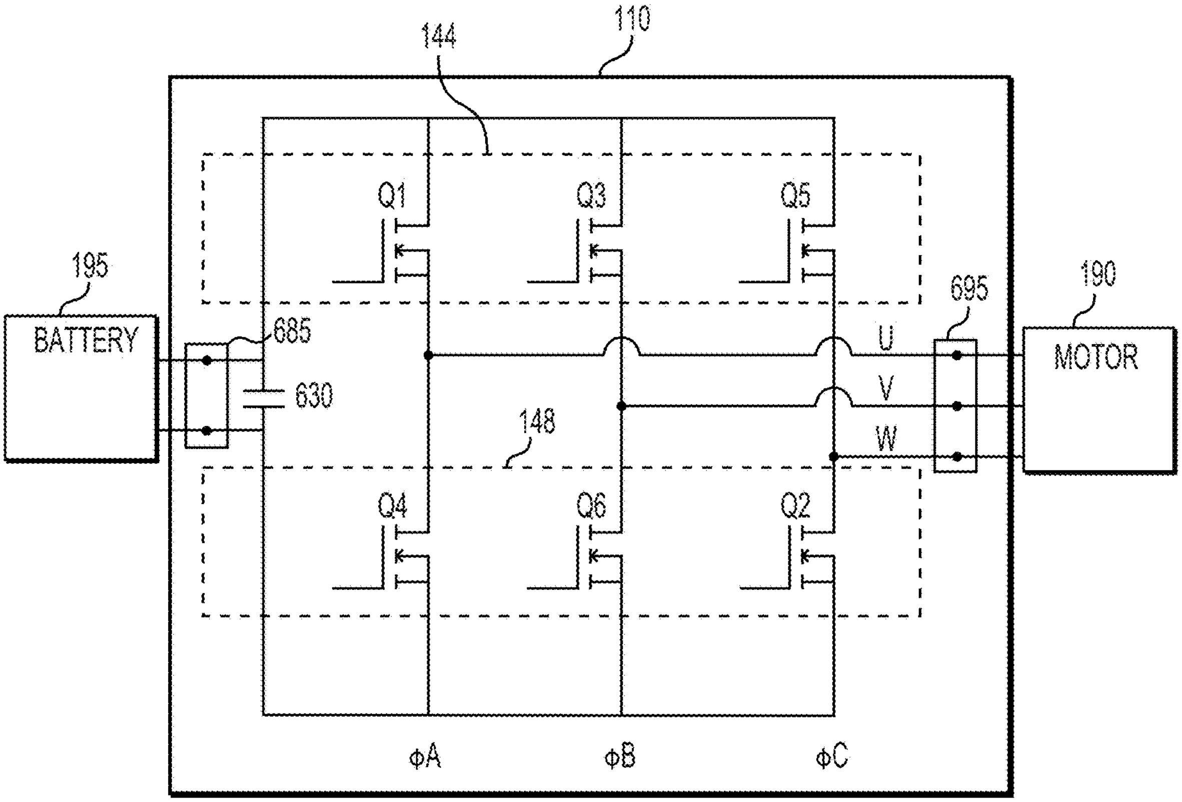
FIG. 4 depicts an electrical power schematic of a three phase inverter module, according to one or more embodiments.

FIG. 4 depicts an electrical power schematic of a three phase inverter module, according to one or more embodiments. The inverter 110 in FIG. 4 may be the inverter 110 in FIGS. 1 and 2. Inverter 110 may be used to convert DC power from a battery in an electric vehicle to AC power, to drive an electric motor of the electric vehicle, for example, but embodiments are not limited thereto. Additionally, inverter 110 may be bidirectional, and used to convert DC power to AC power, or to convert AC power to DC power.

As shown in FIG. 4, inverter 110 may be connected to battery 195 (e.g., DC power supply) and motor 190. Inverter 110 may include upper phase switches 144 and lower phase switches 148. Upper phase switches 144 and lower phase switches 148 in FIG. 4 may correspond to the upper phase switches 144 and the lower phase switches in FIG. 2. A first phase (ϕA) may include switches Q1 and Q4, a second phase (ϕB) may include switches Q3 and Q6, and a third phase (ϕC) may include switches Q5 and Q2. Upper phase switches 144 may include first phase switch Q1, second phase switch Q3, and third phase switch Q5. Lower phase switches 148 may include first phase switch Q4, second phase switch Q6, and third phase switch Q2. Switches Q1-Q6 may be metal-oxide-semiconductor field-effect transistors (MOSFET), for example, but embodiments are not limited thereto.

Upper phase switches 144 and lower phase switches 148 may be driven by a pulse width modulated (PWM) signal generated by inverter controller 300 (shown in FIG. 3) to convert DC power delivered via the set of input terminals 685 at bulk capacitor 630 to three phase AC power at outputs U, V, and W (correlating with phases A, B, and C, respectively) via the set of output terminals 695 to motor 190. Additionally, although FIG. 4 illustrates a three-phase inverter, the disclosure is not limited thereto, and may include single phase or multi-phase or multi-level inverters.

As a result of system design, a significant amount of high voltage energy may be stored on the bulk capacitor 630 of the inverter 110. This stored high voltage energy must be dissipated to prevent human exposure to dangerous voltage levels. A function of inverters called "active discharge" may allow for the controlled dissipation of the stored energy in the bulk capacitor 630. Battery 195 providing energy to the inverter 110 may be disconnected prior to initiating active discharge of the bus to avoid discharging the battery 195. The active discharge function may have the ability to quickly dissipate high voltage bus energy for safety in events such as vehicle service, vehicle crash, and the like. The rate of discharge may be a function of initial bus voltage, capacitance, and the energy dissipation mechanism. Government/OEM regulations may also dictate what discharge rates are required.

Inverter 110 may have a safety requirement to discharge the bulk capacitor 630 on the inverter 110, in the event of a crash or other fault situation, in a short period of time, such as between 1 and 3 seconds, for example, but embodiments are not limited thereto. Inverter 110 may not discharge the bulk capacitor 630 using windings of motor 190, which requires the motor 190 to not be shorted, and inverter controller 300 to be available. Inverter 110 may not discharge the bulk capacitor 630 using a dedicated resistive discharge, and may not require a high power resistor with associated switching and control.

Accordingly, inverter 110 may use switching losses in upper phase switches 144 and lower phase switches 148 to discharge energy in bulk capacitor 630. Controlling the upper phase switches 144 and lower phase switches 148 ON/OFF (also referred to as enabling/disabling) may create losses that can be predicted. Switching numerous times at a high frequency rate may contribute to a significant amount of these accumulated losses. A rate of the discharge (losses) may be proportional to the switching frequency. These losses may be used to discharge bulk capacitor 630 and the HVDC bus quickly, without the added cost and complexity of using motor windings or a dedicated resistive discharge. Additionally, by eliminating the resistive element from traditional approaches, substantial cost, circuit board area, and unwanted heat may be saved.

Inverter 110 may discharge bulk capacitor 630 using gate drivers (e.g. isolated gate drivers, high voltage upper phase controller 130, upper gate driver 142, etc.) to operate the upper phase switches 144 and lower phase switches 148 in a linear mode, which may effectively use the power switches as a resistor by controlling the gate positive bias voltage and/or switching. One power switch (e.g. Q1) may be turned ON as in a normal operation, and the other power switch (e.g. Q4) may be pulsed ON with a reduced gate voltage. The bulk capacitor 630 and HVDC bus may be discharged via specific PWM pulses.

Figure 5:
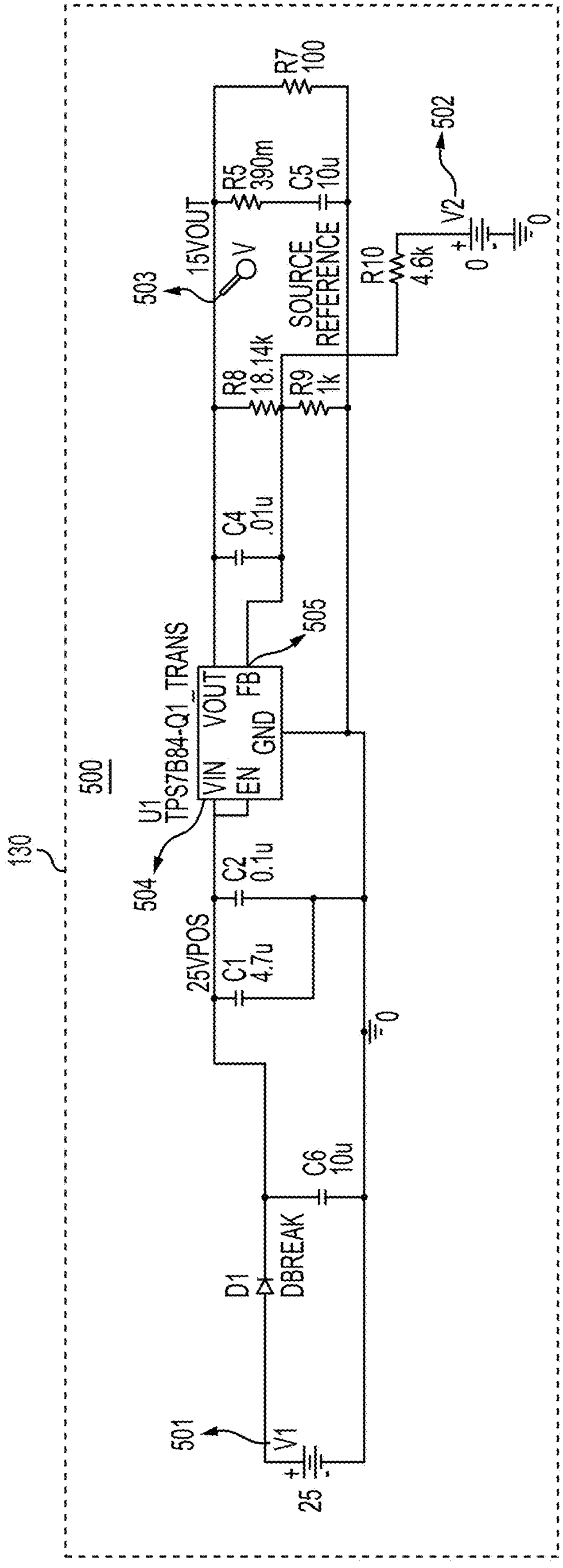
FIG. 5 depicts an exemplary gate driver power supply, according to one or more embodiments.

FIG. 5 depicts an exemplary gate driver power supply, according to one or more embodiments. Gate driver power supply 500 may be included in the high voltage upper phase controller 130. Gate driver power supply 500 may include a low-dropout linear regulator 504 (U1), a primary voltage source 501 (V1), an adjustable voltage source 502 (V2), and several other electrical elements (e.g., diodes, capacitors, and resistors, etc.) connected in series, parallel, etc. The low-dropout linear regulator 504 may include one or more terminals including a feedback terminal 505 and an output terminal 503. The lower phase system of inverter 110 may be similar to the upper phase system as described above.

The primary voltage source 501 (V1) may be the output of an isolation transformer (not shown in FIG. 5) included in the gate driver power supply 500. As illustrated in FIG. 5, when a voltage of 0V is applied to the adjustable voltage source 502 (V2), an output voltage through the output terminal 503 of the gate driver power supply 500 may be 15V, which may be a voltage to drive gates of SiC MOSFETS. The lower phase system of inverter 110 may be similar to the upper phase system as described above.

The upper gate driver 142 may be configured to activate an under-voltage lockout (UVLO) fault to protect the inverter 110 in cases where voltages provided to the upper gate driver 142 fall outside a predetermined range. In case the upper gate driver 142 activates the UVLO fault, the upper gate driver 142 may not be operable and as a result, the inverter 110 may not be operable. The predetermined range of voltage may be provided by the manufacturer of the upper gate driver 142. The upper gate driver 142 may be configured to communicate with external devices through serial peripheral interface (SPI), and may be configured to mask (or disable) the UVLO fault through the SPI. The lower phase system of inverter 110 may be similar to the upper phase system as described above.

The upper gate driver 142 may be configured to activate a dead-time protection (DTP) to protect the inverter 110 from damage caused by a shoot through current. In case the upper gate driver 142 activates the DTP, the upper gate driver 142 may not be operable and as a result, the inverter 110 may not be operable. Predetermined parameters to determine whether to active the DTP may be provided by the manufacturer of the upper gate driver 142. The upper gate driver 142 may be configured to communicate with external devices through SPI, and may be configured to mask (or disable) the DTP through the SPI. The lower phase system of inverter 110 may be similar to the upper phase system as described above.

The high voltage upper phase controller 130 may be configured to communicate with the upper gate driver 142 via SPI to mask (or disable) the UVLO fault and/or the DTP of the upper gate driver 142. The lower phase system of inverter 110 may be similar to the upper phase system as described above. For example, the high voltage lower phase controller 135 may be configured to communicate with the lower gate driver 146 via SPI to mask (or disable) the UVLO fault and/or the DTP of the lower gate driver 146.

As discussed above, the inverter 110 may be configured to discharge bulk capacitor 630 using the upper gate driver 142 and the lower gate driver 146 to operate the upper phase switches 144 and the lower phase switches 148. The upper gate driver 142 may be configured to operate the upper phase switches 144 by inputting a gate voltage and/or a PWM signal to the upper phase switches 144. The gate voltage and/or the PWM signal input to the upper phase switches 144 may be output by the upper gate driver 142. The gate driver power supply 500 may be configured to output an output voltage and/or a PWM signal to the upper gate driver 142. The lower phase system of inverter 110 may be similar to the upper phase system as described above.

The gate voltage and/or the PWM signal output by the upper gate driver 142 to the upper phase switches 144 to operate the upper phase switches 144 may be based on (or proportional to, or controlled by) the output voltage and/or the PWM signal output by the gate driver power supply 500, to the upper gate driver 142. The output voltage and/or the PWM signal output by the gate driver power supply 500, to the upper gate driver 142 may be output through the output terminal 503 in the gate driver power supply 500. The lower phase system of inverter 110 may be similar to the upper phase system as described above.

The output voltage and/or the PWM signal output by the gate driver power supply 500, through the output terminal 503 may be adjustable (or may be controlled) by using the adjustable voltage source 502 (V2). The lower phase system of inverter 110 may be similar to the upper phase system as described above.

Figure 6:
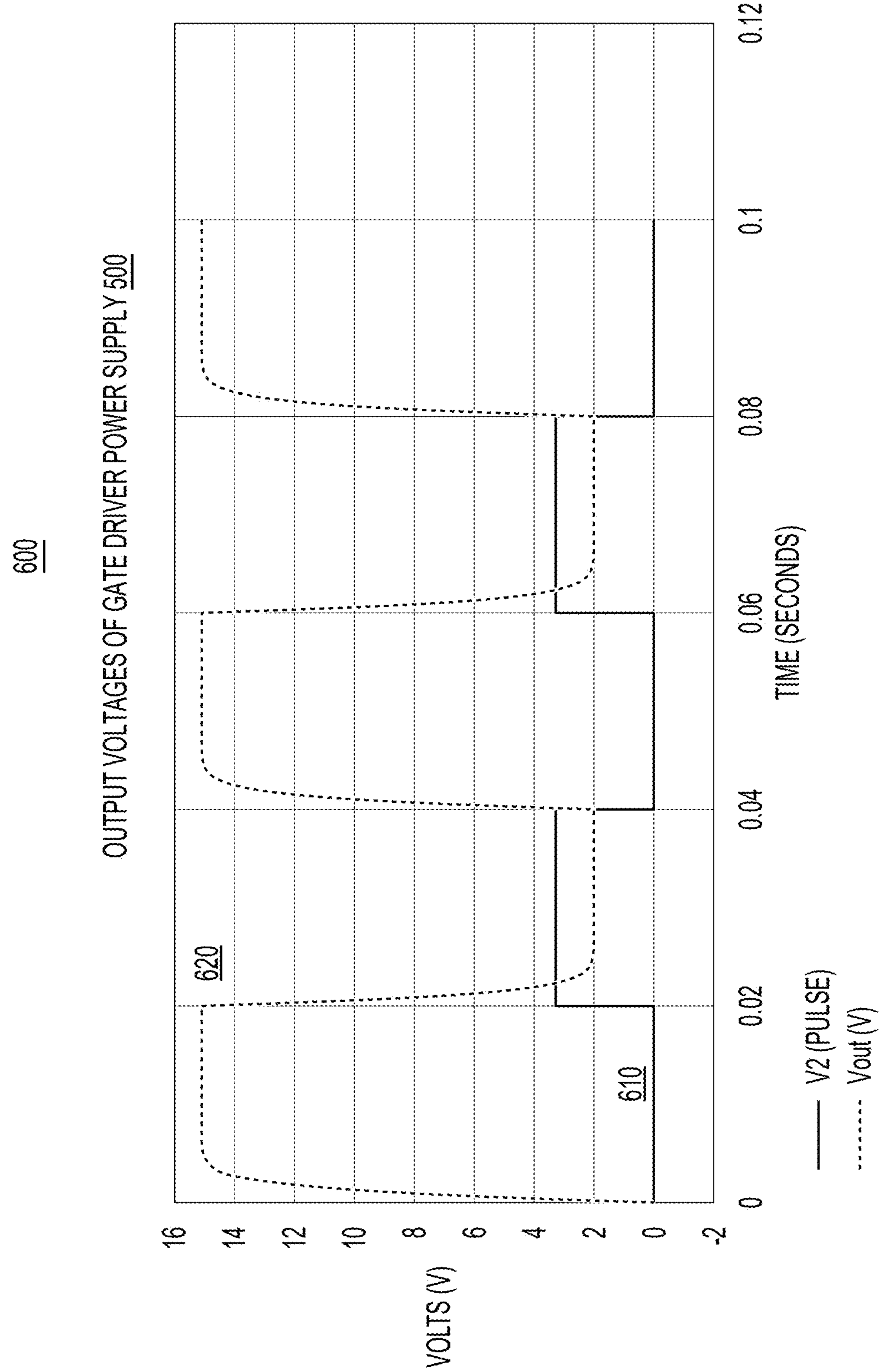
FIG. 6 depicts an exemplary plot of output voltage of a gate driver power supply of FIG. 5, according to one or more embodiments.

FIG. 6 depicts an exemplary plot of output voltage of gate driver power supply 500 of FIG. 5, according to one or more embodiments. The plot 600 includes a graph having voltage levels in the x-axis, time (in seconds) in the y-axis, graph line 610, and graph line 620. The plot 600 includes a graphical view of an output voltage Vout (e.g., graph line 620) of gate driver power supply 500 related to an input voltage V2 (e.g., PWM signal input) (e.g., graph line 610) of gate driver power supply 500.

As shown in FIG. 6, when the adjustable voltage source 502 (V2) is 0V (e.g., graph line 610), gate driver power supply 500 may have an output voltage Vout of 15V (e.g., graph line 620) through output terminal 503. As shown in FIG. 6, when the adjustable voltage source 502 (V2) is 3.3V (e.g., graph line 610), gate driver power supply 500 may have an output voltage Vout of 2V (e.g., graph line 620) through output terminal 503. As shown in FIG. 6, adjustable voltage source 502 (V2) may output a PWM signal having a pulse width of 0.02 s (seconds), but embodiments are not limited thereto. For example, the pulse width of the PWM signal may be 250 ns (nano-seconds), but embodiments are not limited thereto.

Some systems have a fixed pulse width modulated (PWM) signal of 6.4 μs (micro seconds) of ON time and 600 μs (micro seconds) of OFF time. According to one or more embodiments, with DTP disabled, the PWM may have an ON time that is shorter (e.g., 250 ns (nano seconds)) and an OFF time that can be as long as necessary (e.g., not limited) to allow dies to cool down.

In one or more embodiments, a minimum output voltage (V2) input to a feedback terminal of a gate driver power supply may be restricted to an operational voltage of an isolation gap, which may vary from gate driver to gate driver. In some systems, gate drivers cannot operate below 5V and/or 2.5V. In some systems, lower gate voltages are determined by threshold voltages of power MOSFETs.

According to one or more embodiments, linear active discharge of a bulk capacitor may be accomplished by using any gate driver (e.g., smart gate driver) that provides the ability to disable an UVLO fault and a DTP. According to one or more embodiments, a resistive divider circuit may be used to digitally control the output of a gate driver power supply by controlling the feedback terminal on the gate driver power supply.

According to one or more embodiments, the output voltage of a gate driver power supply may be adjusted to be decreased by a controlled voltage divider and an independent voltage source, which may be a pulse width modulated (PWM) voltage source through an RC filter or digital-to-analog converter (DAC), but embodiments are not limited thereto.

According to one or more embodiments, the gate voltage of a smart gate driver may be controlled without limitations (or manufacture's limitations) integrated into selected integrated circuits (ICs) of some smart gate drivers, which may have 20 mV, 400 mV, or 250 mV resolutions, but embodiments are not limited thereto. According to one or more embodiments, variable pulse width modulated (PWM) signals may be used to control gate signals applied to power switches, instead of being limited to use fixed pulse widths.

One or more embodiments disclosed herein may be applied to gate drivers having adjustable requirements and/or threshold variations. According to one or more embodiments, verification and/or confirmation of operation bench between under-voltage lockout (UVLOs) faults and minimum operating voltages may be necessary, but embodiments are not limited thereto. According to one or more embodiments, programmable and/or configurable gate drivers may be needed, but embodiments are not limited thereto. According to one or more embodiments, gate drivers with ability to disable dead-time protection (DTP) faults and/or mask (or disable) under-voltage lockout (UVLO) faults may be needed, but embodiments are not limited thereto. According to one or more embodiments, controllable voltage source options may require digital isolators (e.g., RC filtered PWM and/or DAC control). A voltage limitation for the V2 input may be the minimum voltage on the high side of the gate driver to transmit signals across the isolation barrier, but embodiments are not limited thereto.

One or more embodiments disclosed herein may be used with any gate driver with dead-time protection (DTP) disabling ability and/or under-voltage lockout (UVLO) fault masking ability to perform active discharge through power modules, but embodiments are not limited thereto. One or more embodiments disclosed may be used in a platform application, but embodiments are not limited thereto. According to one or more embodiments, system cost reductions may be achieved without paying an additional premium on gate drivers IP and/or existing discharge algorithms may be used.

One or more embodiments may allow gate voltage to be controllable independent of gate driver features and/or a PWM control of the gate voltage may be achieved. According to one or more embodiments, discharge acceleration may be accomplished by increased gate voltage directly by increased pulse on time and/or frequency.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:

an inverter configured to convert DC power from a battery to AC power to drive a motor, wherein the inverter includes:

a bulk capacitor;

one or more switches;

a gate driver including an under-voltage lockout (UVLO) fault and a dead-time protection (DTP); and one or more controllers, wherein the one or more controllers are configured to provide one or more of a gate voltage or a pulse width modulated (PWM) signal to the gate driver to control the one or more switches to discharge the bulk capacitor.

2. The system of claim 1, wherein the inverter further includes:

a gate driver power supply configured to provide an output voltage to the gate driver, wherein the one or more controllers are further configured to provide the one or more of the gate voltage and the PWM signal to the gate driver by controlling the output voltage of the gate driver power supply.

3. The system of claim 2, wherein the gate driver power supply includes an adjustable voltage source configured to control the output voltage of the gate driver power supply to the gate driver.

4. The system of claim 3, wherein the one or more controllers are configured to control the output voltage of the gate driver power supply to the gate driver by controlling a voltage output of the adjustable voltage source.

5. The system of claim 4, wherein the gate driver power supply includes a low-dropout linear regulator that includes an input terminal and an output terminal, wherein the voltage output of the adjustable voltage source is input to the input terminal, and wherein the output voltage of the gate driver power supply is output through the output terminal.

6. The system of claim 1, wherein the one or more controllers are configured to disable the UVLO fault and the DTP.

7. The system of claim 6, wherein the one or more controllers are configured to disable the UVLO fault and the DTP using a serial peripheral interface (SPI) of the gate driver.

8. The system of claim 3, wherein the inverter includes a high voltage area and a low voltage area, wherein the gate driver power supply is provided in the high voltage area of the inverter.

9. The system of claim 1, further comprising:

the battery configured to supply the DC power to the inverter; and the motor configured to receive the AC power from the inverter to drive the motor, wherein the system is provided as a vehicle including the inverter, the battery, and the motor.

10. A system including one or more controllers configured to:

control a gate driver to output one or more of a gate voltage or a pulse width modulated (PWM) signal to one or more switches to discharge a bulk capacitor based on controlling an output voltage of a gate driver power supply to the gate driver, wherein the gate driver power supply includes a low-dropout linear regulator.

11. The system of claim 10, wherein the low-dropout linear regulator includes an adjustable voltage source, and wherein the one or more controllers are further configured to control the output voltage of the gate driver power supply to the gate driver by controlling an output voltage of the adjustable voltage source.

12. The system of claim 10, wherein the gate driver is configured to have an under-voltage lockout (UVLO) fault and a dead-time protection (DTP).

13. The system of claim 12, wherein the one or more controllers are configured to disable the UVLO fault and the DTP of the gate driver by using a serial peripheral interface (SPI) of the gate driver.

14. The system of claim 12, wherein the gate driver is an automotive safety integrity level (ASIL-D) gate driver.

15. The system of claim 13, wherein the one or more controllers are configured to enable the UVLO fault and the DTP of the gate driver after the bulk capacitor is discharged.

16. The system of claim 15, wherein the one or more of the gate voltage and the PWM signal includes a gate voltage and a PWM signal, wherein the gate voltage output by the gate driver when the UVLO fault is disabled is lower than the gate voltage output by the gate driver when the UVLO fault is enabled, and wherein a pulse width of the PWM signal output by the gate driver when the DTP is disabled is shorter in time than a pulse width of the PWM signal output by the gate driver when the DTP is enabled.

17. A system comprising:

a gate driver configured to have an under-voltage lockout (UVLO) fault and a dead-time protection (DTP);

a gate driver power supply configured to supply an output voltage to the gate driver; and one or more controllers configured to control the output voltage of the gate driver power supply to the gate driver to output one or more of a gate voltage or a pulse width modulated (PWM) signal to one or more switches to discharge a bulk capacitor.

18. The system of claim 17, further comprising:

an adjustable voltage source configured to be controlled by the one or more controllers, wherein the one or more controllers are configured to control the output voltage of the gate driver power supply by controlling an output voltage of the adjustable voltage source.

19. The system of claim 18, wherein, the one or more controllers are configured to disable the UVLO fault and the DTP of the gate driver to discharge the bulk capacitor, and the one or more controllers are configured to enable the UVLO fault and the DTP of the gate driver after the bulk capacitor is discharged.

20. The system of claim 18, wherein the one or more controllers are further configured to control the output voltage of the gate driver power supply to the gate driver to output the gate voltage and the PWM signal to the one or more switches to discharge the bulk capacitor.

* * * * *